United States Patent [19]

Colombo et al.

[11] 3,740,729

[45] June 19, 1973

[54] READ-ONLY MEMORY DEVICE WITH CAPACITIVE COUPLING OF INFORMATION

[75] Inventors: Gianni Colombo, Sesto Calende; Giovanni Ippolito, Milan, both of Italy

[73] Assignee: AGES S.P.A. - Azienda Generale Elettronica Servomeccanismi, Borgoticino (Prov. Novara), Italy

[22] Filed: May 3, 1971

[21] Appl. No.: 141,062

[30] Foreign Application Priority Data

Oct. 1, 1971 Italy ................................892908

[52] U.S. Cl. ...................... 340/173 CA, 340/173 SP

[51] Int. Cl. ........................ G11c 11/24, G11c 17/00

[58] Field of Search ............... 340/173 SP, 173 CA, 340/166 R

[56] References Cited

UNITED STATES PATENTS

| | | | |
|---|---|---|---|
| 3,373,409 | 3/1968 | Lord | 340/173 SP |
| 3,251,043 | 5/1966 | Haskell | 340/173 SP |
| 3,506,969 | 4/1970 | Abbas | 340/173 CA |

OTHER PUBLICATIONS

Taub, Modular Read Only Store, 4/64, IBM Technical Disclosure Bulletin, Vol. 6, No. 11, pp. 43–44.

*Primary Examiner*—Bernard Konick
*Assistant Examiner*—Stuart Hecker
*Attorney*—Guido Modiano and Albert Josif

[57] ABSTRACT

A read-only storage device including a first plate element defining a first printed circuit with a plurality of parallel conductive strips and a number of square conductive areas separated from the strips, and a second plate element defining a second printed circuit with a number of lines and conductive zones electrically connected therewith and a number of square areas connected to the lines. These first and second plate elements are supposed to one another, thereby to define a double capacitive coupling between their conductive portions, the first plate element being connected to addressing circuits and differential reading amplifiers by permanent electrical connections while the second plate element has no electrical connections and may be easily replaced for changing the information stored in the storage device.

1 Claim, 2 Drawing Figures

Figure 1:
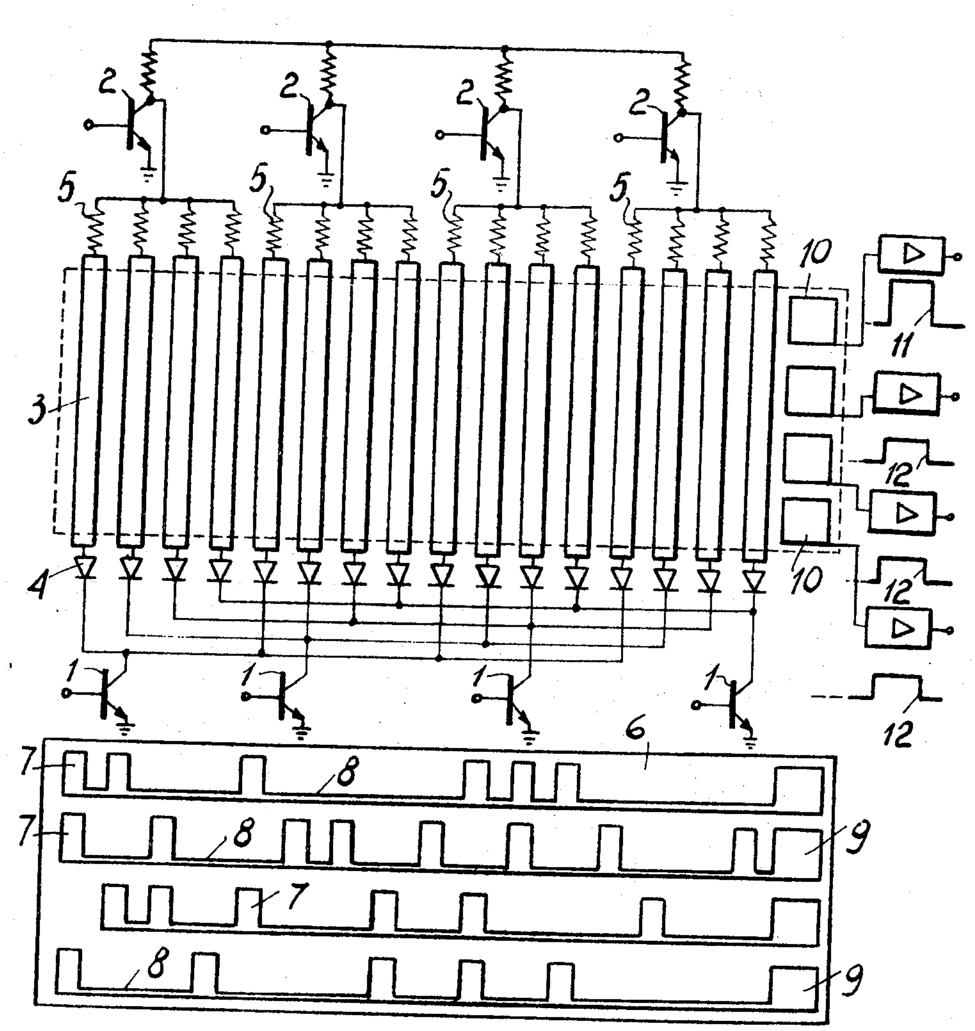

INVENTORS
Gianni COLOMBO and Giovanni IPPOLITO
BY
AGENT

READ-ONLY MEMORY DEVICE WITH CAPACITIVE COUPLING OF INFORMATION

The present invention relates to a read-only memory device, particularly for code conversion systems and the like.

As known, code conversion or selected coded operation sequence systems are reducible to logicblocks in which a certain input arrangement corresponds to a predetermined output arrangement.

The conversion or other similar problems can then be reduced to the use of a device also called read-only memory device, because it is not possible (nor required) to electrically modify the content thereof.

Considering now only binary elements, which are the only ones concerned, assuming that the input bits are indicated at $h$ and the outputs bits at $k$, the possible input configurations are $2^h$ and each of them corresponds to $k$ output bits, and thus the capacity of the storage is equal to $2^h k$ bits, i.e., possible cells in which a binary value can be storaged.

Among the available storage systems one can mention the following:

1. - diode storages
2. - integrated memories
3. - magnetic memories of various types.

Many criteria of evaluation of such memories exist of which the most important are:

a. the cost
b. the overall dimensions
c. the programming flexibility
d. the speed.

The storages of the first type, i.e., the diode memories are expensive and cumbersome, although very flexible and fast and thus they are particularly suitable for small capacities.

The storages of the second type, which comprise large scale integration circuits ( LSI ) prevalingly of MOS type (metal oxyde semi-conductors) are of low cost, not cumbersome fast enough but of low flexibility in that laborious and costly operations are required to manufacture the same according to the requirements of the user.

Finally, the memories or storages of the third type, i.e., the magnetic storages, are quite economic, of small dimensions and in some cases very flexible and quite fast, but the programming thereof involves a long accurate manual work which is liable to errors, These memories are suitable for high capacities.

The device according to the invention is intended to comprise the advantages of the above mentioned solutions, particularly from the view point of a typical user of automatic controls and for remote data transmission and processing where a read-only memory is required having the following characteristics:

low cost
reduced overall dimensions
high flexibility together with a sage and economical manufacturing method suitable both for mass production and for manufacturing a reduced number of memories
not very high speed.

According to the invention there is provided a read-only memory device, characterized in that it comprises at least a printed circuit including a first portion having a number of components and a second portion without any component, the said two portions being connected to one another by means of at least one capacitative connection.

Further details will better appear from the following description of a storage according to the invention illustrated in one of its possible embodiments in the accompanying drawing, in which FIG. 1 shows the said storage with the said two printed circuits shown spaced apart side by side.

Figure 2:
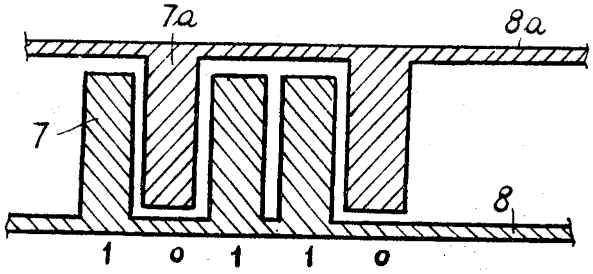

FIG. 2 is a modification of the second printed circuit.

For clarity sake the shown example relates to the case in which only four input bits and four output bits are available, i.e., with a capacity of 64 bits (FIG. 1).

According to a known method for addressing magnetic memories a first address decoding is effected and the 4 + 4 input circuits to the memory, which in practice include transistors of type 1 and 2 in the figure, are set.

Such circuits are arranged on a first plate element defining a printed circuit on which 16 parallel electrically conductive strips 3 are provided in such a way that the circuits including the transistors 1 and 2, selected in pairs, define one of the 16 strips three of the printed circuit forming the whole circuit.

The diodes 4 act as anti-return separators and are commonly used in any addressing system. The resistors 5 instead of serving to obtain a current as is common in addressing method, provide a tension wave-front according to the following method.

The transistors of type 1 and 2 are usually saturated. By making use of a two phasetimer, at the time T1 the selected transistor of type 1 is cut off. Once the positive front effect generated in the collector and sensed by the strips through the reverse capacities of the diodes 4 disappears, the selected transistor of type 2 is cut off at time T2. The single strip 3 which connects the two selected transistors can be positively charged.

On the first plate element described above a second plate element in form of a printed circuit 6 is arranged which is opposite to the first one and separated therefrom by a thin insulating layer. On such circuit 6 conductive zones 7 are formed which are opposite to the strips 3 and arranged where it is desired to write a "1."

On the selected lines 8 a charge or tension is induced through the square conductive areas 7 which is thus carried to the zones 9 which induce them on the square conductive area 10 connected to the reading amplifiers.

The amplifiers give a positive output pulse 11 which represents along the four output lines the required code. More precisely, along the not selected lines a minor pulse 12 occurs due to the little capacities between the selected strips 3 and the lines 8 and the other undesired connections, this minor pulse being suitable to be discriminated from the useful one.

Mechanical press elements are also provided which keep the two printed circuits opposite to one another and screen elements on both sides in order to protect the whole assembly from the outer disturbances.

The advantages of the system are self-evident.

The addressing has the same complexity as that of a magnetic storage, but much less currents are involved, particularly when average and low speeds are required. The overall dimensions are limited too. In a typical embodiment the strips 3 are 0.6 mms wide and the zones 7 are 0.6 × 10 mms in size.

With a facing surface of 6 $mms^2$, 0.1 mm of insulating thickness and a feeding tension of 20 V, the output has a power higher than that of a magnetic core of the type commonly used in storages.

A substantial portion of the storage is fixed for a given apparatus and already connected to the other circuits.

The programming is effected by a simple substitution of the printed circuit 6 which has no components and is thus of a very low cost. The substitution is particularly easy to carry out due to the provision of the square conductive areas 9 and 10, which carry the signal on the main printed circuit without any connection. The printed circuit can be provided much more larger in dimensions than the zones 7, thereby preventing attenuation of the signal during operation. As a limit in the large capacity, between the square conductive area 9 and 10 one can eliminate the insulating layer in this zone thus obtaining a contact which has not to be necessarily a perfect one and thus no problem arises. For high densities and high capacities the improvement illustrated in FIG. 2 is provided. In order to write ones and zeros instead of a presence or lack of zones 7, zones 7 are provided to show the "ones" and zones 7*a* to show the "zeros." The zones 7 and 7*a* are connected to two lines 8 and 8*a*, respectively, which lead to a differential amplifier. The effect of the undesired pulses 12 in FIG. 1 is thus completely eliminated and the whole assembly is very independent from the tolerances of the tension levels of the feeding tension and from the tolerances of the components.

The storage according to the invention has all the characteristics of cost, size, programming, flexibility and speed mentioned above and the same is particularly suitable to the average capacities (about 1,000 bits) such as those required in code converting systems.

We claim:

1. A read-only memory comprising a first and a second plate element having a plurality of conductive areas on each other for a capacitive coupling between said first and said second plate element, said areas being arranged in rows and columns, wherein, according to the improvement, said conductive areas of said first plate element comprise a plurality of conductive strips arranged parallel to each other and spaced from one another, said conductive strips being electrically connected to addressing circuits by means of permanent electrical connections, and a number of substantially square conductive areas provided for permanent electrical connection each to a respective differential reading amplifier and electrically separated from said strips, and said conductive areas of said second plate element comprise a number of lines equal to the number of said square areas of said first plate element and extending in a sense transverse to that of said parallel strips of said first plate element and conductive zones extending at one side of said lines and provided according to a programming pattern, said second plate element further comprising a number of substantially square conductive areas electrically connected to said lines in prolongation thereof, said first and said second plate elements being removably superposed to one another and separated by an insulating layer, said conductive zones of said second plate element lying facing respective strips of said first plate element and said substantially square areas of said second plate element lying each facing one of said substantially square areas of said first plate element, thereby to provide a first capacitive coupling between said strips and said conductive zones and a second capacitive coupling between said substantially square areas of said second plate element and said substantially square areas of said first plate element, whereby replacement of said second electrically non connected plate element provides a change in the information stored in said read-only memory.

* * * * *